United States Patent [19]

Abe

[11] 4,256,413
[45] Mar. 17, 1981

[54] STRUCTURE FOR MOUNTING BALL JOINT

[75] Inventor: Michio Abe, Kasugai, Japan

[73] Assignee: Tokai TRW & Co. Ltd., Kasugai, Japan

[21] Appl. No.: 848,943

[22] Filed: Nov. 7, 1977

[30] Foreign Application Priority Data

Dec. 29, 1976 [JP] Japan .................. 51-160381

[51] Int. Cl.³ ............................................ F16B 17/00
[52] U.S. Cl. ..................... 403/282; 403/122
[58] Field of Search ............ 403/76, 282, 122–141; 29/149.5 B, 520, 511

[56] References Cited

U.S. PATENT DOCUMENTS

| 2,563,992 | 8/1951 | DeGrave | 29/520 UX |
| 2,936,188 | 5/1960 | Moskovitz | 403/139 |
| 3,007,364 | 11/1961 | Dickie | 29/520 UX |
| 3,175,834 | 3/1965 | Wallace et al. | 403/128 X |
| 3,266,134 | 8/1966 | Moskovitz | 29/149.5 B |
| 3,337,247 | 8/1967 | Moskovitz | 403/138 |

FOREIGN PATENT DOCUMENTS 596136 12/1947 United Kingdom ................ 29/520

Primary Examiner—Andrew V. Kundrat
Attorney, Agent, or Firm—James E. Nilles

[57] ABSTRACT

A ball joint mounting structure for mounting a ball joint in one of two structural members to be joined together by the ball joint is disclosed. The mounting structure comprises self-caulking engaging means provided by the hollow cylindrical housing of the ball joint and on the cylindrical portion of said one structural member. As the housing is being press fitted into the cylindrical portion, at least one of the ball joint and member plastically deforms to thereby firmly secure the ball joint to the one member.

1 Claim, 10 Drawing Figures

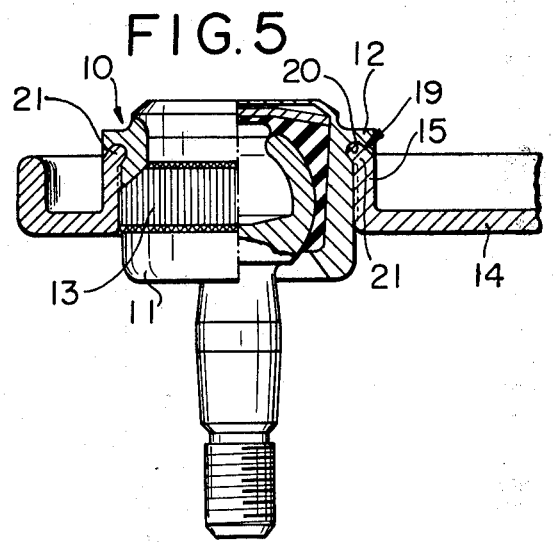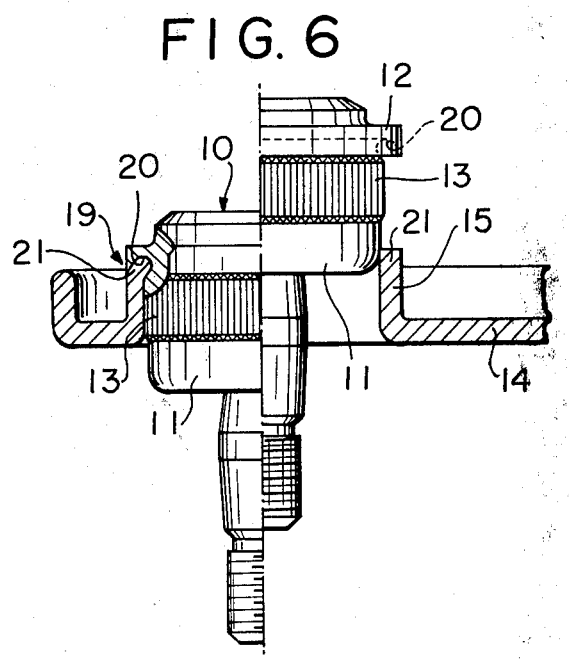

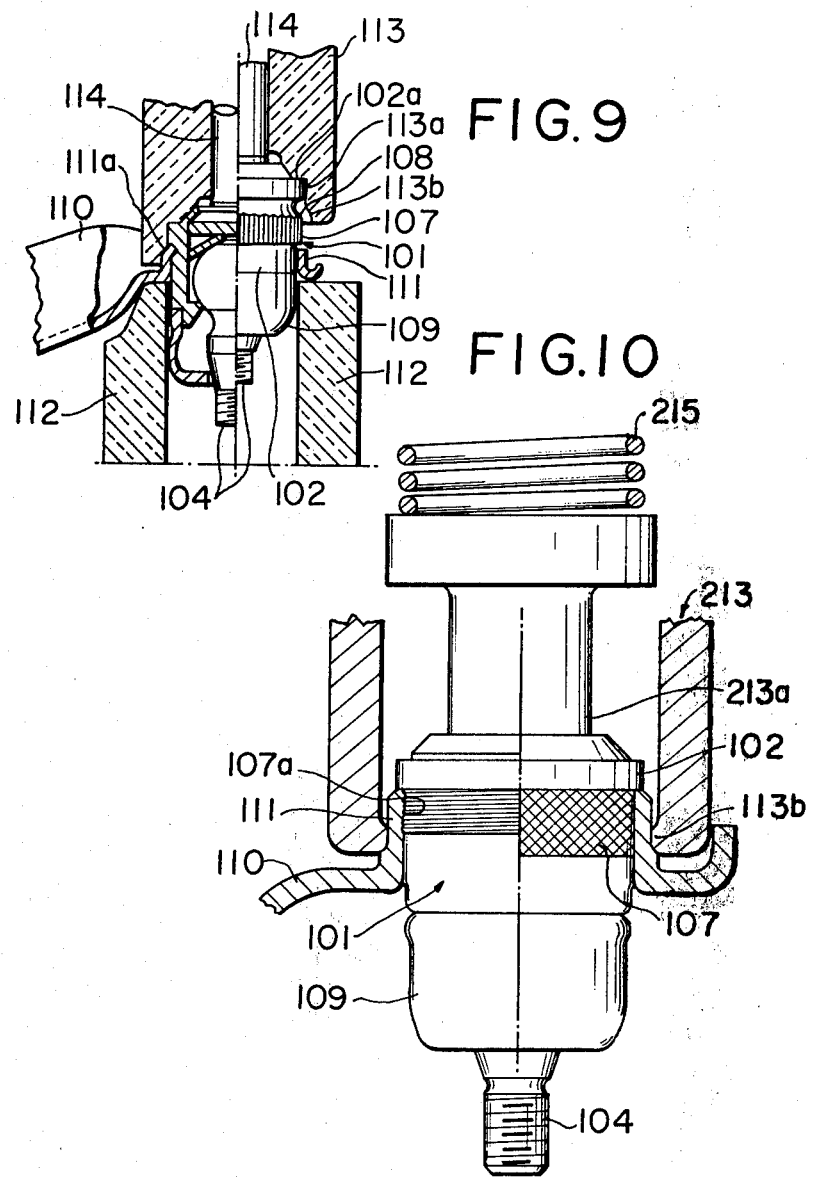

STRUCTURE FOR MOUNTING BALL JOINT

BACKGROUND OF THE INVENTION

This invention relates to a mounting structure for ball joints which are adapted to connect between two structural members such as the upper and lower arms of the suspension mechanism in a vehicle, for example and more particularly, to a mounting device for mounting such a ball joint in the lower arm of the above type in a simple and reliable manner. This invention also relates to a method for mounting the ball joint in the lower arm of the vehicular suspension mechanism in a simple and reliable manner.

The ball joint of the above type has a hollow cylindrical housing formed of sheet metal which is adapted to be held in position within the cylindrical portion of the lower arm. Various structures for mounting the ball joint of the above type in the lower arm have been proposed and practically employed and such conventional ball joint mounting devices will now be described referring to FIGS. 1 through 4 of the accompanying drawings. The ball joint mounting structure of FIG. 1 comprises an annular flange 12 provided adjacent to one or the upper end (as seen in FIG. 1) of the hollow cylindrical housing 11 of a ball joint 10 radially and outwardly extending from the housing 11 and a knurled portion 13 provided in the outer periphery of the housing 11 between the opposite ends of the housing. In mounting the ball joint 10 in one of two structural members to be joined together by the ball joint such as the lower arm 14 of the suspension mechanism of a vehicle, for example, the knurled portion 13 of the ball joint housing 11 is press fitted in the cylindrical portion 15 of the lower arm 14 until the flange 12 abuts against the lower arm cylindrical portion 15.

The ball joint mounting structure of FIG. 2 is substantially similar to the device of FIG. 1 except that the device further includes a snap ring 16 adjacent to the end opposite from the flange 12 which is adapted to be fitted on the cylindrical portion 15 after the ball joint housing 11 has been press fitted in the lower arm 14 in the manner mentioned hereinabove in connection FIG. 1 to thereby hold the ball joint in position within the lower arm.

In the ball joint mounting structure of FIG. 3, in place of the snap ring 16, a threaded portion 17 is formed in the outer periphery of the cylindrical ball joint housing 11 between the opposite ends of the housing and a mating threaded portion 17' is formed in the inner surface of the cylindrical portion 15 of the lower arm 14. In mounting the ball joint 10 in the lower arm 14, the ball joint housing 11 is threaded into the threaded portion 17' of the lower arm 14 to secure the ball joint to the lower arm.

The ball joint mounting structure of FIG. 4 is substantially similar to the device of FIG. 1 except that a weld 18 is formed between the lower edge of the wall of the lower arm cylindrical portion 15 and the end of the ball joint housing 11 opposite from the flange 12 to thereby hold the ball joint 10 in position within the lower arm.

However, the ball joint mounting structure of FIG. 1 has the disadvantage that the ball joint housing 11 easily comes off the lower arm 14 and the ball joint mounting structure of FIG. 2 has the disadvantages that the device requires an additional processing step to provide an annular groove in the ball joint housing 11 for receiving the snap ring 16 and the distance between the groove and flange 12 is required to be precisely determined resulting in an increase in production cost. Furthermore, in the ball joint mounting device of FIG. 2, the housing 11 is required to be subjected to heat-treatment or high frequency induction hardening so that the snap ring receiving groove will have high strength. The ball joint mounting structure of FIG. 3 has the disadvantage that since the housing of the ball joint and the cylindrical portion of the lower arm are provided with threaded portions and the threaded portions are required to be subjected to high frequency induction hardening, the processing of the structure requires a substantial time resulting in an increase in production cost. The ball joint mounting structure of FIG. 4 has the disadvantages that the structure requires a troublesome operation such as welding and if the bearing of the ball joint is formed of synthetic resin, the welding can not be carried out because the high temperature derived from the welding increases the temperature of the ball joint to a substantially high value and causes degeneration of lubricant.

SUMMARY OF THE INVENTION

Thus, one object of the present invention is to provide a ball joint mounting structure which can effectively eliminate the disadvantages inherent in the conventional ball joint mounting structures and which can simply and firmly secure the ball joint housing to the cylindrical portion of the lower arm.

Another object of the present invention is to provide a ball joint mounting structure which comprises an annular flange formed at one end of the housing of a ball joint and having an annular groove in the inner surface acting as self-caulking means and the upper edge of the wall of the cylindrical portion of the lower arm of the suspension mechanism of a vehicle whereby as the housing of the ball joint is being press fitted into the cylindrical portion of the lower arm, the flange plastically deforms to be caulked against the upper edge of the wall of the lower arm cylindrical portion by means of the annular groove in the flange to thereby firmly secure the ball joint to the lower arm.

A further object of the present invention is to provide a ball joint mounting device which eliminates the annular flange at the upper end of the housing of the ball joint and allows the ball joint to be press fitted in the cylindrical portion of the lower arm with the dust cover attached to the ball joint.

The above and other objects and attendant advantages of the present invention will be more readily apparent to those skilled in the art from a reading of the following detailed description in conjunction with the accompanying drawings which show preferred embodiments of the invention for illustration purpose only, but not for limiting the scope of the same in any way.

BRIEF DESCRIPTION OF THE DRAWINGS

FIG. 5 is an elevational view in partial section of one embodiment of ball joint mounting structure constructed in accordance with the present invention;

FIG. 6 is an elevational view of said ball joint mounting structure of FIG. 5 with one half portion of the figure showing the initial mounting stage of the ball joint in which the housing of the ball joint is press fitted in one of two structural members which are to be joined together by the joint and the other half portion of the figure showing the final mounting stage of the ball joint in which the housing of the ball joint is caulked against the one structural member;

FIG. 9 is a fragmentary vertically sectional view showing the manner in which the ball joint is mounted in said one structural member in accordance with one embodiment of mounting method of the present invention;

FIG. 10 is a fragmentary vertically sectional view showing a modified embodiment of the present invention;

DETAILED DESCRIPTION OF THE PREFERRED EMBODIMENTS

Figure 1:
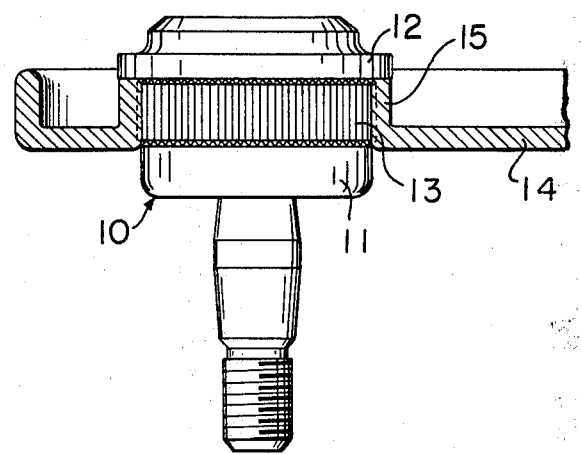
FIGS. 1 through 4 are elevational views in partial section of conventional ball joint mounting structures.
Figure 2:
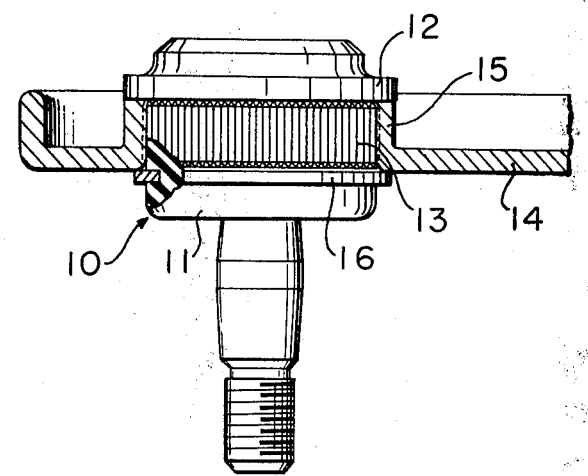
Figure 3:
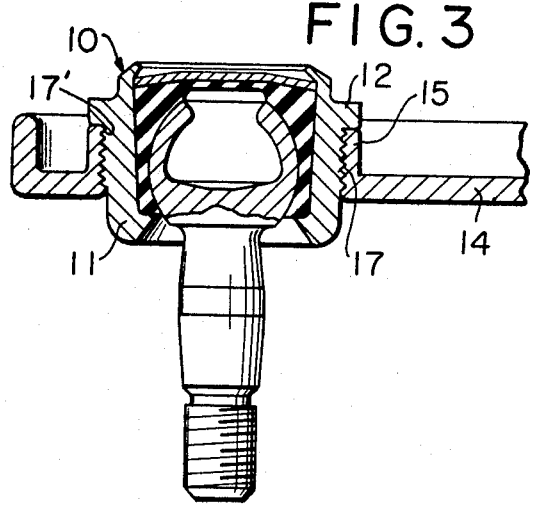
Figure 4:
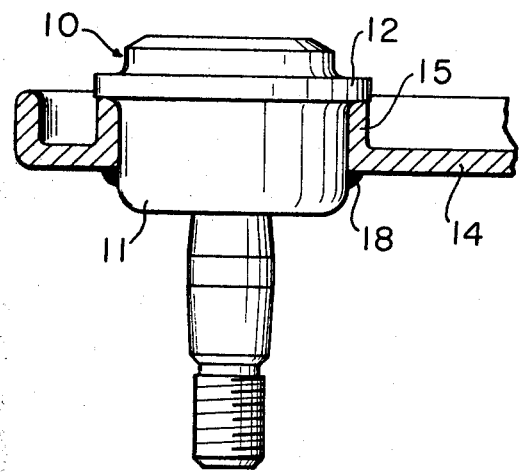

A first embodiment of ball joint mounting by the present structure invention will now be described referring to FIGS. 5 and 6 of the accompanying drawings. The parts of the ball joint mounting device of FIGS. 5 and 6 which correspond to those of the devices of FIGS. 1 through 4 are assigned the same reference numerals thereto. The ball joint mounting structure of the invention is characterized in that as the housing 11 of the ball joint 10 is press fitted into the cylindrical portion 15 of the lower arm 14, an engaging portion 19 which will be referred to "self-caulking portion" hereinbelow is provided between the ball joint housing 11 and lower arm cylindrical portion 15. The self-caulking portion 19 comprises an annular groove 20 in the inner surface of the annular flange 12 adjacent to the upper end of the ball joint cylindrical housing 11 and the upper edge 21 of the cylindrical portion 15 of the lower arm 14 when the ball joint housing 11 has been fully press fitted within the lower arm cylindrical portion 15 (see FIG. 5). The annular groove 20 is formed to have a width substantially corresponding to the thickness of the wall of the lower arm cylindrical portion 15 and an outer diameter substantially corresponding to the outer diameter of the lower arm cylindrical portion 15. In addition, the annular groove 20 inclines downwardly from the upper edge 21 of the cylindrical portion 15 towards the center of the housing 11 and in the illustrated embodiment, the inclination angle of the annular groove 20 is within the range 10° to 30°. And in the present invention, the effective diameter of the knurled portion 13 of the hollow cylindrical housing 11 substantially corresponds to the inner diameter of the lower arm cylindrical portion 15.

In mounting the ball joint 10 in the lower arm 14, as shown more clearly in FIG. 6, the housing 11 of the ball joint 10 is coaxially aligned with the cylindrical portion 15 of the lower arm 14 with the end of the housing opposite from the flange 12 facing the upper end 21 of the cylindrical portion and thereafter, the housing 11 is press fitted into the cylindrical portion 15 by applying a force to the flange 12 at the upper end of the housing 11 until the inner surface of the flange 12 abuts against the upper end of the cylindrical portion 15. While the housing 11 is being press fitted into the cylindrical portion 15 of the lower arm 14 in the manner mentioned hereinabove, the inner surface of the wall of the cylindrical portion 15 is gradually plastically deformed in conformity with the contour of the knurled portion 13 of the housing 11. Even after the flange 12 on the housing 11 has abutted against the upper edge of the lower arm cylindrical portion 15, when the press-fitting force is continuously applied to the flange 12, the upper edge 21 and its adjacent portion of the cylindrical portion 15 is forced into the annular groove 20 in the flange 12 and plastically deformed along the inwardly directing inclination of the annular groove 20 or towards the center of the housing 11. As is more clearly shown in FIG. 5, the press-fitting operation is completed when the upper edge 21 and its adjacent portion of the wall of the cylindrical portion 15 of the lower arm 14 has completely filled up the annular groove 22. Once the upper end and its adjacent portion of the wall of the cylindrical portion 15 has been completely and firmly received within the annular groove 20 as shown in FIG. 5, the ball joint housing 11 is firmly mounted in the lower arm and can not be easily pulled out of the lower arm.

In the mounting operation as mentioned above, the lower arm 14 is fixedly supported on an suitable support block (not shown) and the ball joint is driven downwardly by suitable driving means (not shown).

In designing the ball joint mounting structure of the invention, the dimensions of various portions of the structure are selected as follows:

| | |
|---|---|
| The diameter of the ball portion of the ball stud | 28 mm |
| The pitch of the knurls | 1 mm (90 knurls) |
| The outer diameter of the housing | 43 mm |
| The depth of the annular groove | about 3 mm |
| The cylindrical portion of the lower arm | The inner diameter of 42–42.2 mm The outer diameter of 46–46.2 mm |

Figure 7:
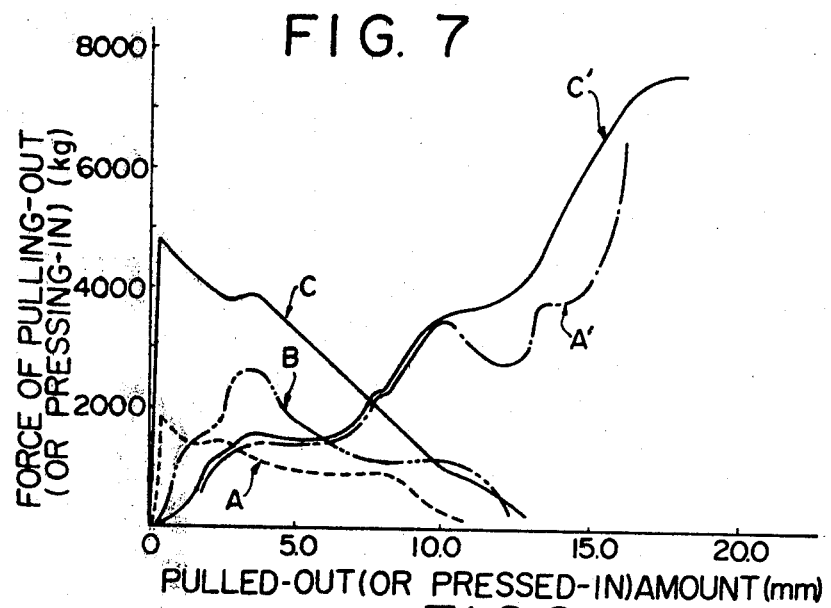
FIG. 7 is a comparative graph showing the results of pullout tests conducted on ball joints mounted in structural members by the employment of the ball joint mounting device of the invention and the conventional ball joint mounting devices, respectively.

The pull-out tests were conducted on the ball joint mounting structure of the invention having parts of the above-mentioned dimensions and the conventional ball joint mounting structures and the results of the tests are shown in the graph of FIG. 7. In the graph of FIG. 7, the axis of ordinate represents the force required to pull (or press in) the housing out of the lower arm cylindrical portion, and the axis of abscissa represents the pulled out (or pressed in) amount. The curve A shown by the dotted line represents the force required to pull the ball joint housing out of the lower arm cylindrical portion in the conventional ball joint mounting structure of FIG. 1, the curve A' shown by the one-dot line represents the force required to press fit the ball joint housing into the lower arm cylindrical portion in the conventional ball joint mounting structure of FIG. 1. The curve B shown by the two-dot line represents the force required to pull the ball joint housing out of the lower arm cylindrical portion in the conventional ball joint mounting structure of FIG. 2. The curve C shown by the solid line represents the force required to pull the ball joint housing out of the lower arm cylindrical portion and the curve C' shown by the solid line represents the force required to press fit the ball joint housing into the lower arm cylindrical portion in the ball joint mounting structure of the invention. As is clear from the graph of FIG.

7, it will be noted that in the ball joint mounting structure of the invention, the force required to pull the ball joint out of the lower arm cylindrical portion is about 2 to 2½ times as high as that in the conventional ball joint mounting devices. Thus, the present invention can firmly secure the ball joint housing to the lower arm cylindrical portion.

In the embodiment described hereinabove, although the upper edge and its adjacent portion of the wall of the cylindrical portion of the lower arm are arranged to be forced in the annular groove in the inner surface of the flange on the ball joint housing, the present invention is not limited to such arrangement. Instead, the arrangement in which the wall of the lower arm cylindrical portion is provided with a groove and the outer peripheral edge of the flange on the ball joint housing is snugly fitted in the groove and then pressed against the cylindrical portion, for example, is also possible within the scope of the invention. And the shape of the groove is not limited to the annular shape as described hereinabove and illustrated in FIGS. 5 and 6 and may take various other shapes. In short, in the present invention, as the ball joint housing is being press fitted in the lower arm cylindrical portion, the housing and cylindrical portion cooperate to self-lock by caulking and various changes may be resorted to by those skilled in the art so long as the principle is utilized.

As is clear from the foregoing, according to the present invention, no additional processing step or steps and additional part or parts are required for preventing the ball joint housing from being pulled out of the lower arm cylindrical portion and the housing is formed by substantially cold working and not subjected to any heat treatment. Therefore, the ball joint device of the invention is less expensive and the housing can be simply and firmly secured to the lower arm without requiring any skilled hand to provide a reliable ball joint mounting structure.

Figure 8:
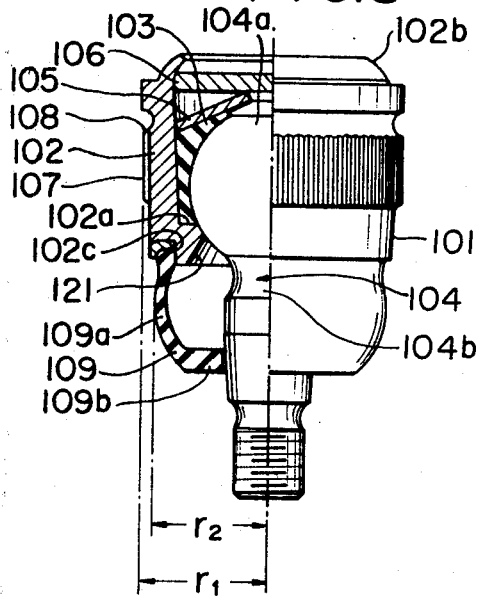
FIG. 8 is an elevational view of a ball joint to be mounted in one of two structural members which are to be joined together by the ball joint in accordance with one embodiment of mounting method of the invention.

Now turning to FIGS. 8 and 9 in which a second embodiment of ball joint mounting structure of the invention is shown, in these Figures, reference numeral 101 denotes a ball joint which is adapted to be mounted in one of two structural members to be joined together by the ball joint such as the lower arm of a vehicle and which comprises a hollow cylindrical metal housing 102 and a ball stud 104 received within the housing 102 and having a ball portion 104a journalled within the housing 102 through a bearing 103. The lower end of the bearing 103 is supported on an annular flange 102a extending radially and inwardly from the lower end of the housing 102 and the upper end of the bearing is biased against the inner surface of a closure plate 106 which extends across the hollow portion in the housing 102 adjacent to the upper end thereof by means of a preload spring 105. The closure plate 106 is attached to the inner surface of the housing 102 and is adapted to close the hollow portion in the housing by caulking the thinned wall portion 102b of the housing radially and inwardly against the closure plate. As shown in FIG. 8, the flange 102a has a tapered portion 121 formed by bevelling the inner surface of the housing at the lower end thereof so that the free rocking movement of the stud portion 104b of the ball stud 104 will not be interfered with. The construction of the ball joint 101 is not precisely limited to the illustrated one, but may take any other suitable construction within the scope of the invention.

The housing 102 of the ball joint 101 has a knurled portion 107 in the outer periphery between the opposite ends thereof and the knurled portion is adapted to be press fitted in the cylindrical portion of a mounting arm such as the control or lower arm of the suspension mechanism in a vehicle as will be described hereinbelow.

The outer diameter of the portions of the housing 102 other than the knurled portion 107 are so selected that the housing can be smoothly inserted into the cylindrical portion of the mounting or lower arm and the effective diameter of the knurled portion 107 is preferably one substantially corresponding to the inner diameter of the cylindrical portion of the mounting arm. The ball joint 101 further has an annular groove 108 of substantially semi-circular cross section in the outer periphery of the housing 102 in an position just above the knurled portion 107 and the annular groove 108 is adapted to snugly receive the upper edge of the wall of the cylindrical portion of the mounting arm in the manner as will be described hereinbelow.

A rubber dust cover 109 is provided to protect the exposed stud portion of the ball stud 104 which extends downwardly beyond the lower end of the housing 102 and holds an amount of lubricant to lubricate the contacting faces of the bearing 103 and ball portion 104a. The dust cover 109 comprises an upper cylindrical portion 109a and an integral bottom portion 109b through which the stud portion 104b of the ball stud 104 extends. As shown, the outer diameter $r_2$ of the cylindrical portion 109a of the dust cover 109 is smaller than the outer diameter $r_1$ of the knurled portion 107 of the housing 102 and the upper edge of the dust cover cylindrical portion 109a is fitted on the reduced diameter lower portion 102c of the housing 102 by means of suitable means.

The method for mounting the ball joint of the invention in the cylindrical portion of the mounting arm of the suspension mechanism in a vehicle will now be described referring to FIG. 9 of the accompanying drawings. In FIG. 9, reference numeral 110 denotes the mounting or lower arm formed of sheet metal and, reference numeral 111 denotes the cylindrical portion of the arm in which the housing 102 of the ball joint 101 is to be press fitted. In mounting the ball joint 101 in the cylindrical portion 111 of the arm 110, a specific die unit is employed. The die unit comprises a hollow cylindrical lower die 112 and an upper die 113 which has a pressurizing portion 113a adaped to abut against the upper edge 102d of the housing 102 of the ball joint 101 and a reducing portion 113b adapted to caulk (force) the upper edge 111a of the cylindrical portion 111 of the arm 110 into the annular groove 108 in the ball joint housing 102. In FIG. 9, reference numeral 114 denotes an ejection pin received in the hollow portion in the upper die 113.

The right-hand half portion of FIG. 9 shows the initial stage of the ball joint mounting operation in which the ball joint 101 and mounting or lower arm 110 are properly set with respect to the lower die 112 and the upper die 113 is about to be moved downwardly towards the mating lower die 112 to press fit the ball joint 101 into the cylindrical portion 111 of the mounting arm 110 and the left-hand half portion of FIG. 9 shows the final stage of the ball joint mounting operation in which the ball joint is completely mounted in the cylindrical portion 111 of the mounting arm 110. In mounting the ball joint 101 in the cylindrical portion 111 of the mounting arm 110, first of all, the cylindrical portion 111 of the mounting arm 110 is positioned in coaxial relationship to the hollow portion in the lower die 112 and the ball joint 101 having the dust cover 109 attached thereto is inserted into the cylindrical portion 111 of the mounting arm 110 and the hollow portion in the lower die 112 until the portion of the housing just below the knurled portion 107 is positioned within the hollow portion of the lower die 112 as shown in FIG. 9. With the cylindrical portion 111 of the arm 110 and the ball joint 101 held in the positions described just above, when the upper die 113 is driven downwardly towards the lower die 112 with the impulsive force delivered to the upper die by means of the press arm (not shown), the pressurizing portion 113a of the upper die 113 engages the upper edge of the wall of the housing 102 to press fit the knurled portion 107 of the housing 102 into the cylindrical portion 111 of the mounting arm 110. When the upper edge 111a of the cylindrical portion 111 reaches the annular groove 108 in the ball joint housing 102 just before the completion of the press fitting operation, the cylindrical portion upper edge 111a is guided towards the axis of the housing 102 by the creasing portion 113b of the upper die 113 until the upper edge enters the annular groove 108 in the housing 102 to be fixed there. By the combination of the press fitting and caulking as mentioned hereinabove, the ball joint 101 is firmly secured to the mounting arm 110. Thereafter, the upper die 113 is retracted from the lower die 112 and the ball joint and mounting arm assembly 101 and 113 is released from the upper die 113 by the ejection pin 114.

FIG. 10 shows a further modified embodiment of the invention and in this figure, the parts which correspond to those of the embodiment of FIG. 8 are assigned the same numerals thereto and description of such corresponding parts will be omitted. In the embodiment of FIG. 10, the annular groove 108 in the embodiment of FIG. 8 where the cylindrical portion 111 engages is eliminated and instead, the cylindrical portion of the mounting arm is adapted to engage the grooves defined between the knurls of the knurled portion 107 of the ball joint 101. Reference numeral 213 denotes a modified upper die which comprises a pusher bar 213a adapted to apply a downwardly directed force to the ball joint 101 through a spring 215 and a cylindrical creasing portion 113b adapted to apply a radially and inwardly directed force to the cylindrical portion 111 of the mounting arm 110 whereby the inner surface of the cylindrical portion 111 is caused to plastically deform to enter into the grooves defined between the knurls of the knurled portion 107 of the ball joint housing 102.

As is clear from the foregoing description of the embodiments of FIGS. 8 and 9, according to the present invention, since the housing of the ball joint is not required to be provided with any specific flange which serves as a self-caulking means, there is no possibility of occurrence of any crack or cracks in the ball joint as experienced in the formation of the flange which is performed by forging and thus, the ball joint has high mechanical strength. And since the ball joint can be mounted in the mounting arm even after the dust cover has been secured to the ball joint, the ball joint mounting operation can be carried out in a simple and economical manner and in this way, sticking of dust to the ball joint before the ball joint is mounted in the mounting arm can be effectively prevented because the ball joint can be mounted in the mounting arm with the dust cover attached thereto.

While several embodiments of the invention have been shown and described in detail it will be understood that the same are for illustrated purpose only and not to be taken as a definition of the invention, reference being had for this purpose to the appended claims.

What is claimed is:

1. In a ball joint mounting structure for mounting a ball joint in one of two structural members adapted to be joined together by said ball joint, said one structural member having a cylindrical portion, said ball joint having a hollow cylindrical housing press fitted into said cylindrical portion, characterized in that a self-caulking engaging means is provided between said housing and said cylindrical portion for automatically caulking said housing and said cylindrical portion as said housing is being press fitted into said cylindrical portion, and that said self-caulking engaging means comprises a groove formed in the outer surface of said housing and a wall portion of said cylindrical portion snugly received in said groove as said housing is being press fitted into said cylindrical portion, said housing having a knurled portion, said annular groove having a width substantially corresponding to the wall thickness of said cylindrical portion and an outer diameter substantially corresponding to the outer diameter of said cylindrical portion and inclined in frusto-conical form and the effective diameter of said knurled portion in the housing substantially corresponding to the inner diameter of said cylindrical portion, whereby as said housing is being press fitted into said cylindrical portion, the inner surface of said cylindrical portion is caused to plastically deform in conformity with the contour of said knurled portion until said opening edge is snugly received in said annular groove to thereby cause said housing and cylindrical portion to come into sealing contact with each other.

* * * * *